United States Patent
Wang

(10) Patent No.: US 10,769,956 B2
(45) Date of Patent: Sep. 8, 2020

(54) METHOD AND SYSTEM FOR FINDING A PARKED VEHICLE

(71) Applicant: NANNING FUGUI PRECISION INDUSTRIAL CO., LTD., Nanning (CN)

(72) Inventor: Hon-Da Wang, Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/255,015

(22) Filed: Jan. 23, 2019

(65) Prior Publication Data
US 2020/0234597 A1  Jul. 23, 2020

(51) Int. Cl.
*B60Q 1/48* (2006.01)
*G08G 1/00* (2006.01)
*H04W 4/46* (2018.01)

(52) U.S. Cl.
CPC .............. *G08G 1/205* (2013.01); *H04W 4/46* (2018.02)

(58) Field of Classification Search
None
See application file for complete search history.

(56) References Cited

U.S. PATENT DOCUMENTS

| | | | | |
|---|---|---|---|---|
| 9,204,251 | B1* | 12/2015 | Mendelson | G08G 1/14 |
| 2015/0254611 | A1* | 9/2015 | Perez | G06Q 10/08355 |
| | | | | 705/5 |
| 2016/0379495 | A1* | 12/2016 | Engelen | G08G 1/005 |
| | | | | 340/932.2 |
| 2018/0165967 | A1* | 6/2018 | Lee | G07C 5/0825 |
| 2018/0334163 | A1* | 11/2018 | Beauvais | B60W 30/06 |

* cited by examiner

*Primary Examiner* — Adolf Dsouza
(74) *Attorney, Agent, or Firm* — ScienBiziP, P.C.

(57) ABSTRACT

A method for finding a parked vehicle is disclosed. A moving vehicle executing the method broadcasts packets with an identifier of the vehicle and a time stamp. Other neighboring vehicles surrounding the moving vehicle records content of the packets. The moving vehicle is then parked. A key of the parked vehicle is operable to issue a search request with the identifier to the neighboring vehicles. The neighboring vehicles allocate time frames for relaying the search request with respect to the time stamp. Upon receiving the search request, the parked vehicle replies with a search response along the neighboring vehicles to the key set.

18 Claims, 10 Drawing Sheets

METHOD AND SYSTEM FOR FINDING A PARKED VEHICLE

BACKGROUND

1. Technical Field

The disclosure relates to communication techniques, and more particularly to vehicle to vehicle (V2V) communication.

2. Description of Related Art

Owners may forget the locations of their parked cars in a parking lot. When the parking lot is small, the problem can be overcome with a bit of searching. However, searching becomes difficult in larger lots. Improvement in the art is preferred.

DETAILED DESCRIPTION

Exemplary embodiments of a method for finding a parked vehicle are detailed in the following. The method for finding a parked vehicle is executed by a vehicle with computing and wireless communication capabilities. For example, an embodiment of a method for finding a parked vehicle is executed by an electronic device installed in a vehicle.

Figure 1:
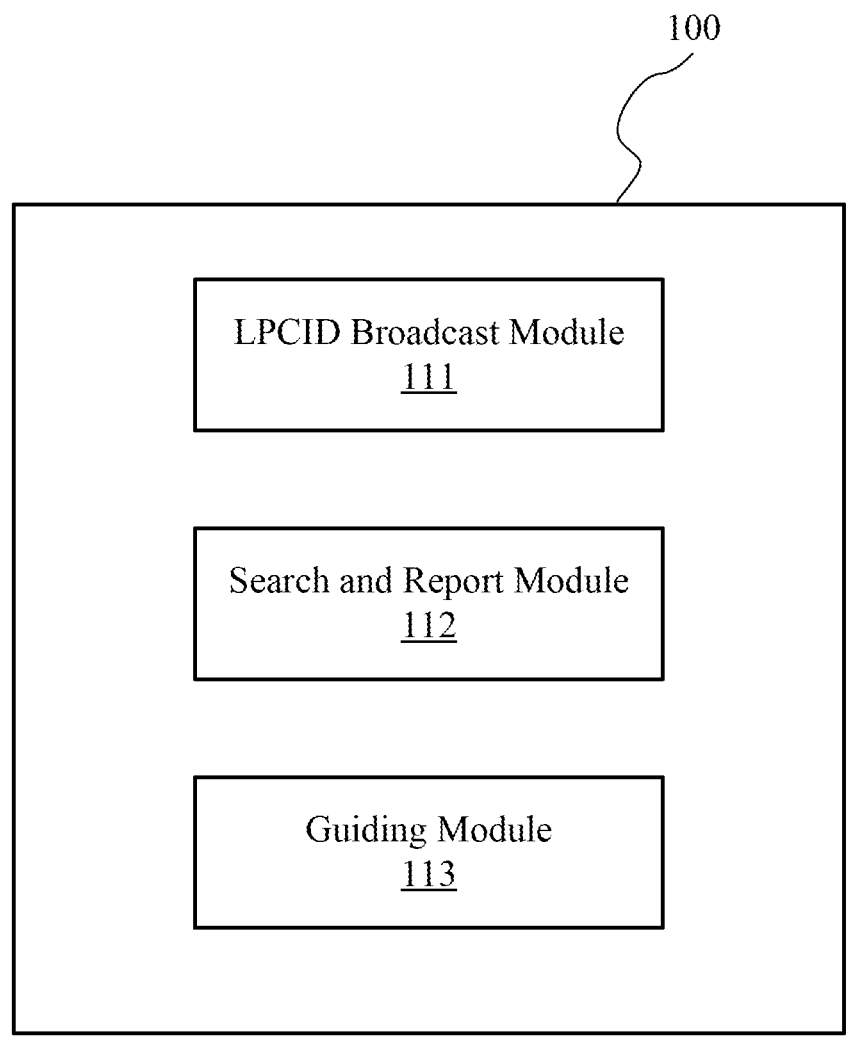
FIG. 1 is a block diagram illustrates an embodiment of a system for finding a parked vehicle according to the present disclosure.

With reference to FIG. 1, a light assisted system 100 for finding a parked car includes a light assisted parking car identifier (LPCID) broadcasting module 111, a search and report module 112, and a guiding module 113. The modules 111, 112, and 113 may be computer executable programs, circuits, or circuits combined with computer executable programs.

Figure 2:
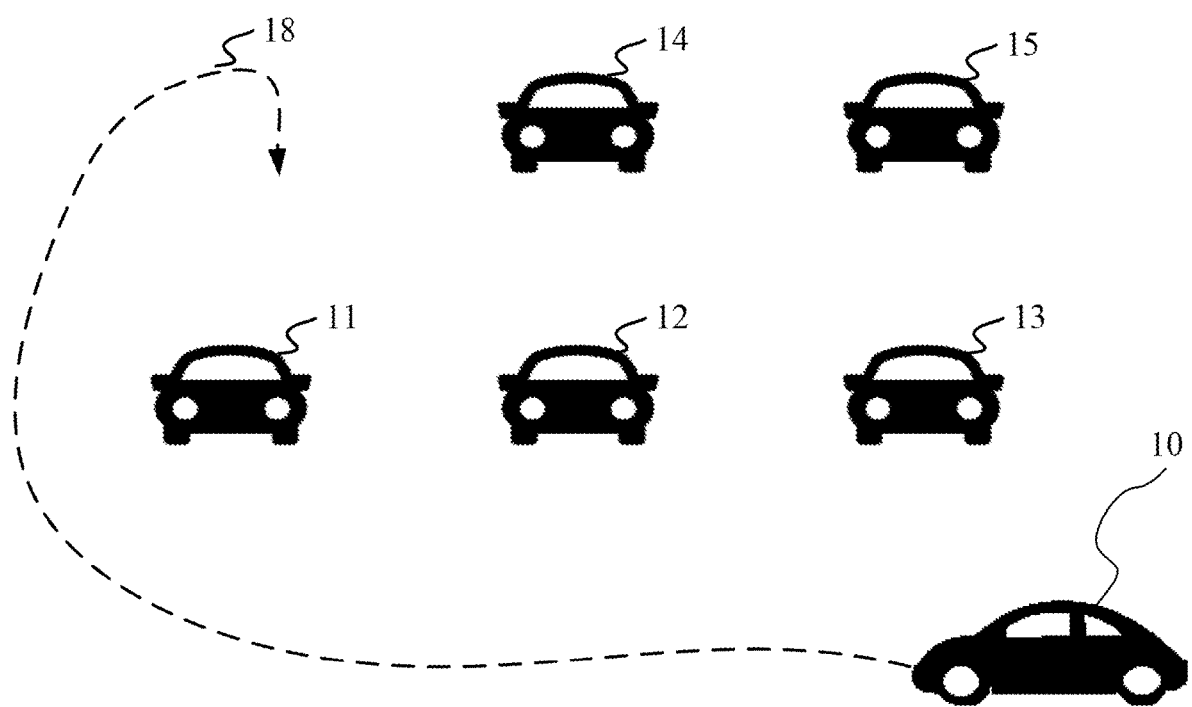
FIG. 2 is a schematic view showing a vehicle moving along a path in a parking lot.
Figure 3:
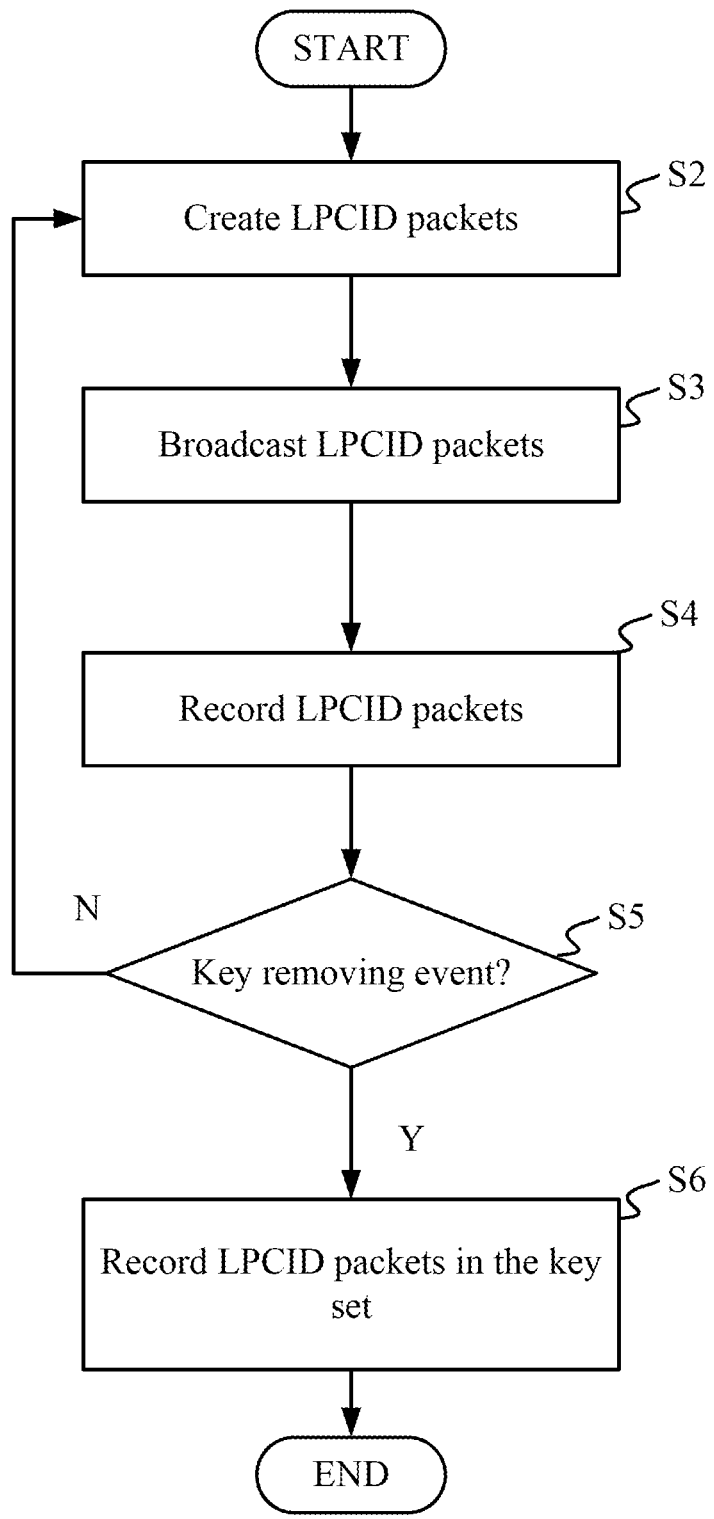
FIG. 3 is a flowchart showing a broadcast process of a light assisted parking car identifier (LPCID) broadcasting module.
Figure 4:
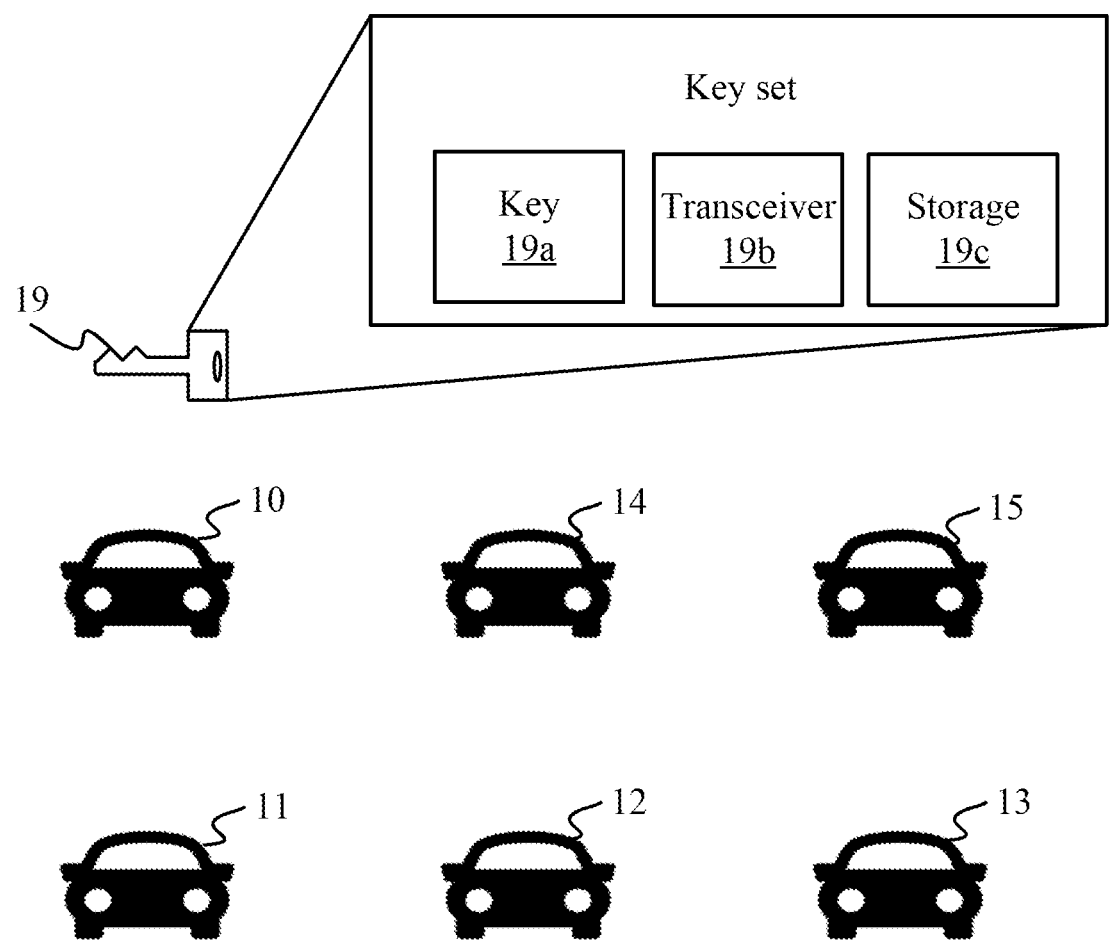
FIG. 4 is a schematic view showing a vehicle parked in a parking lot.

With reference to FIG. 2, a driver of the vehicle 10 visits a parking lot where each of vehicles 10, 11, 12, 13, 14 and 15 is equipped with a system 100. The vehicle 10 is a target vehicle (Vt) that moves along a path 18. Each of the vehicles 11, 12, 13, 14, and 15 is initially a normal car (Vn). The LPCID broadcasting module 111 executes a process in FIG. 3. With reference to FIGS. 3 and 4, for example, the LPCID broadcasting module 111 in vehicle 10 creates (block S2) and broadcasts (block S3) LPCID packets. Each LPCID broadcasting module 111 in each of the vehicles 11, 12, and 13 records (block S4) content of the LPCID packets for all vehicles and keep a count up timer Tc counting up from a time value associated with the LPCID packets. Each of the LPCID packets includes an identifier of the vehicle 10, a component specific identifier to a light of the vehicle 10, a time stamp set by the vehicle 10, a height parameter reflecting a level (e.g. a level in a parking lot) where the vehicle 10 is parked, and data payload. Different vehicles have different LPCIDs. A time value associated with the LPCID packets from a target vehicle Vt means a recorded time which may be a first time value selected from the time stamps in the LPCID packets sent from the target vehicle Vt. Alternatively, the time value associated with the LPCID packets from a target vehicle Vt may be a record of a first reception time on which a normal vehicle Vn receives a LPCID of the target vehicle Vt in the LPCID packets. The vehicle 10 may obtain the height parameter from an altimeter or an accelerometer.

The LPCID broadcasting module 111 in vehicle 10 detects whether a key removing event occurs (block S5). With reference to FIGS. 3 and 4, the vehicle 10 may issue a key removing event when an ignition key 19a is removed from the vehicle 10 or when the vehicle 10 is shut down by the ignition key 19a. Alternatively, the vehicle 10 may issue a key removing event when a machine learning model determines that a possibility of shutting down the vehicle 10 is higher than a threshold. The machine learning model may determine the possibility based on a plurality of sensor parameters of the vehicle 10. The machine learning model may be included in the LPCID broadcasting module 111. Block S2 is repeated if no key removing event occurs. Upon detecting a key removing event, the LPCID broadcasting module 111 in vehicle 10 records one LPCID packet in a memory 19c of the key set 19 (block S6). In the step S6, the LPCID broadcasting module 111 in vehicle 10 obtains sensor parameters from the vehicle 10 and stores the obtained sensor parameters in the memory 19c of the key set 19 in response to the key removing event associated with the ignition key 19a. The sensor parameters include a first height parameter. The vehicle 10 is eventually parked beside the vehicle 11 and the vehicle 14.

In step S3, the LPCID broadcasting module 111 in vehicle 10 may broadcast vehicle to vehicle communication LPCID packets through visible light communication from a front right lamp, a front left lamp, a back right lamp, and a back left lamp. Each LPCID packet emitted from the front right lamp includes, for example, a component specific identifier FRL. Each LPCID packet emitted from the front left lamp includes, for example, a component specific identifier FLL. Each LPCID packet emitted from the back right lamp includes, for example, a component specific identifier BRL. Each LPCID packet emitted from the back left lamp includes, for example, a component specific identifier BLL. Each of the vehicles 11, 12, and 13 after receiving a LPCID packet from the vehicle 10 is labeled as a neighboring vehicle Vg. Each of the vehicles 11, 12, and 13 may obtain light assisted direction information (LD-info) formed by the component specific identifiers which are sent from the vehicle 10. Examples of LD-info is listed in the following Table 1:

TABLE 1

| Event | Neighboring vehicle Vg obtained LD-info from target vehicle Vt |
|---|---|
| Target vehicle Vt moves from right to left in front of Neighboring vehicle Vg | Null, FRL + FLL, FLL, BLL, BRL + BLL, Null |
| Target vehicle Vt moves from left to right in front of Neighboring vehicle Vg | Null, FRL + FLL, FRL, BRL, BRL + BLL, Null |
| Target vehicle Vt moves right to left behind Neighboring vehicle Vg | Null, FRL + FLL, FRL, BRL, BRL + BLL, Null |
| Target vehicle Vt moves left to right behind Neighboring vehicle Vg | Null, FRL + FLL, FLL, BLL, BRL + BLL, Null |
| Target vehicle Vt parks in the right side of Neighboring vehicle Vg | Null, FRL + FLL, FRL, BRL |
| Target vehicle Vt parks in the left side of Neighboring vehicle Vg | Null, FRL + FLL, FLL, BLL |

Figure 5:
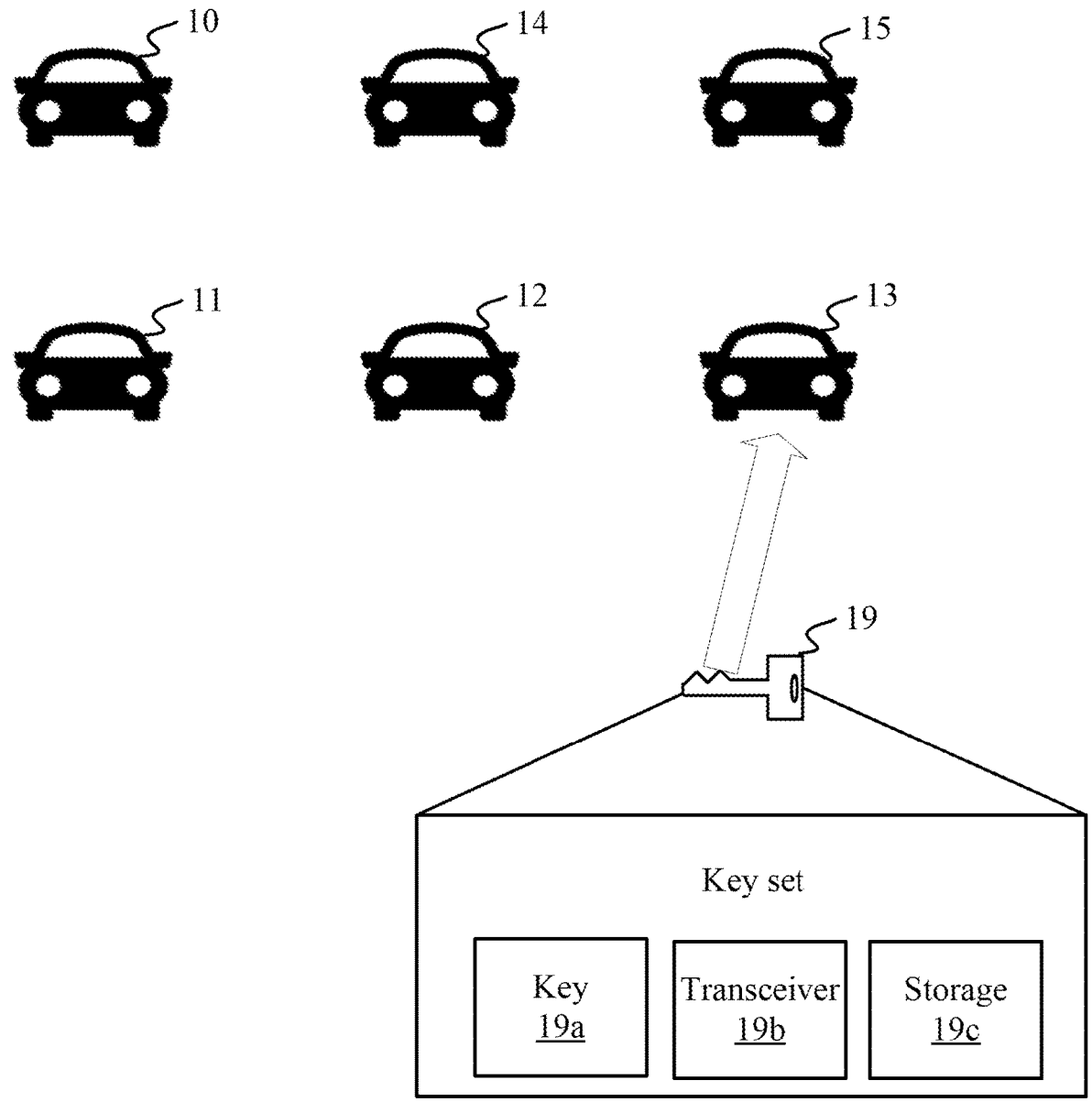
FIG. 5 is a schematic view showing a key set issuing a search request for a target vehicle.
Figure 6:
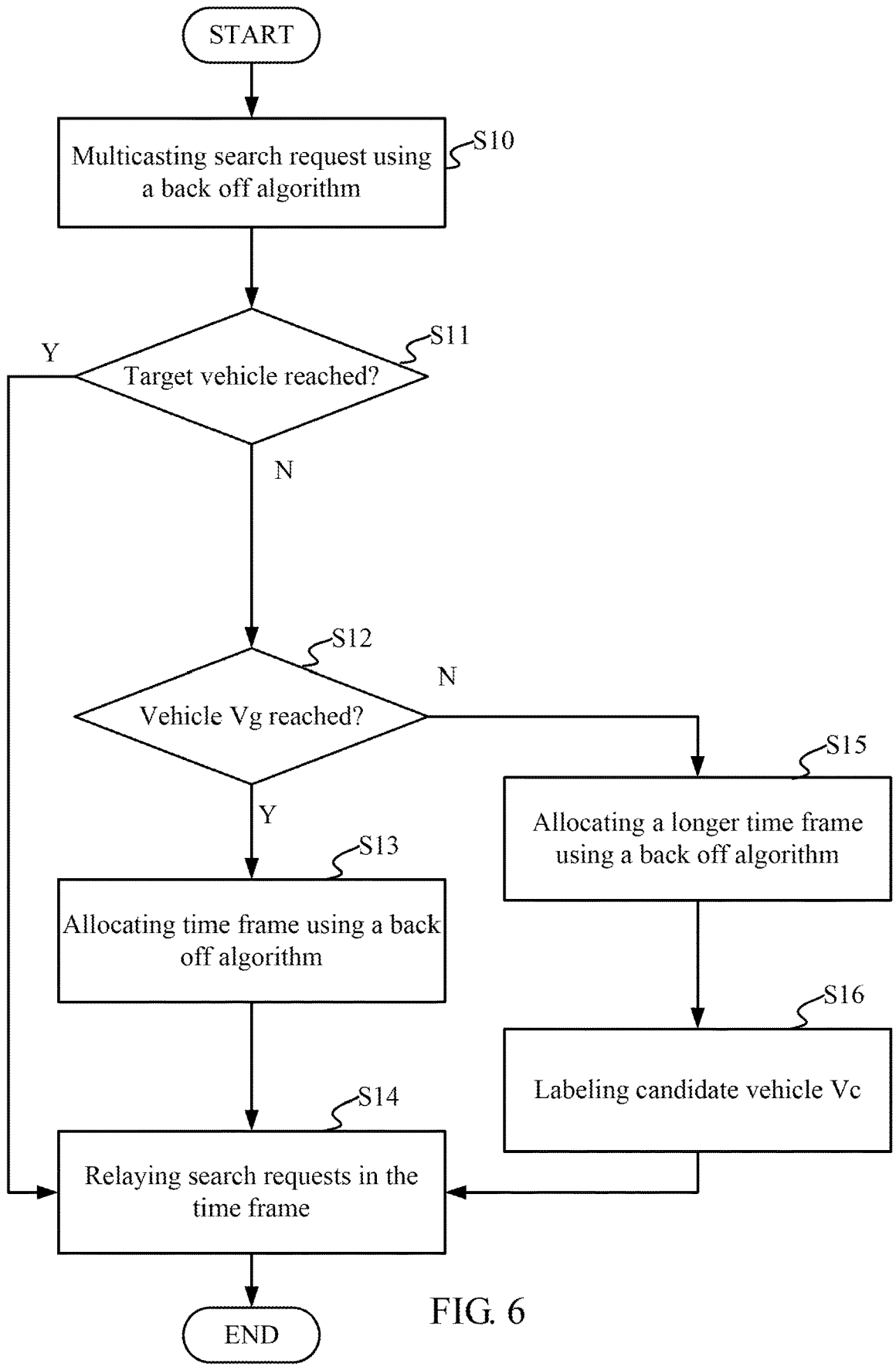
FIG. 6 is a flowchart showing a search process of a search and report module.

With reference to FIG. 5, a driver of the vehicle 10 revisits the parking lot and activates the key set 19. With reference to FIG. 6, the key set 19 upon receiving a triggering signal multicasts a search request for the target vehicle 10 to other vehicles, such as the vehicle 13 (block S10). The search and report module 112 in a vehicle, such as the vehicle 13, upon receiving the search request, determines whether the target vehicle is reached by the search request, for example, by comparing an LPCID in the search request with an LPCID of the vehicle 13 (block S11). In a condition that the target vehicle Vt is reached by the search request, the search and report module 112 in a vehicle replies the search request by sending a search response to a source of the search request in an allocated time frame (block S14). In a condition that the target vehicle is not reached by the search request, the search and report module 112 in the vehicle further determines whether the search request has reached a neighbor vehicle Vg (block S12). For example, when the vehicle 13 has a timer Tc associated with the LPCID of the vehicle 10, the search and report module 112 in the vehicle 13 determines that the search request has reached a neighboring vehicle Vg, allocates a time frame to the vehicle 13 using a back off algorithm, such as the following formula (1) (block S13), and relays the search request in the allocated time frame (block S14). When the vehicle 13 has no timer Tc associated with the LPCID of the vehicle 10, the search and report module 112 in the vehicle 13 determines that the search request has not reached any neighbor vehicle Vg, sets a time parameter $t_i$ to ∞, allocates a lower priority and longer time frame to the vehicle 13 using the back off algorithm (block S15), labels the vehicle 13 as a candidate vehicle Vc (block S16), and relays the search request in the allocated time frame (block S14). For example, the vehicle 13 relays the search request to vehicle 12 and vehicle 15.

The back off algorithm outputs an allocated time frame BP using the time parameter $t_i$ as the input.

$$BP_0 = [0, (2^{c+1} - 1)], \text{ if } 0 < t_i \leq \frac{1}{k}T; \quad (1\text{-}1)$$

$$BP_1 = \left[\sum_{n=0}^{1} (2^{c+1}), \sum_{n=0}^{2} (2^{c+1} - 1)\right], \text{ if } \frac{1}{k}T < t_i \leq \frac{2}{k}T; \quad (1\text{-}2)$$

...

$$BP_k = \left[\sum_{n=k-1}^{k} (2^{c+n}), \sum_{n=k}^{k+1} (2^{c+1} - 1)\right], \text{ if } T < t_i < \infty; \quad (1\text{-}k)$$

where:
T is a preset time for which the LPCID broadcasting module 111 reserves the recorded content of the received LPCID packets;
$t_i$ is obtained from a current value of the timer Tc;
k is a number utilized to categorize time frames;
c is an adjustable constant;
BP is a time frame defined by a pair of real numbers in a square bracket, where the first real number and the second real number respectively represent a lower limit and an upper limit of the time frame, and the time frame may be defined in a proper time unit such as mini seconds or micro seconds.

In an example where c=0 and k=5, $BP_0$ to $BP_5$ may be defined as:

$$BP_0 = [0, 1], \text{ if } 0 < t_i \leq \frac{1}{5}T; \quad (2\text{-}0)$$

$$BP_1 = [3, 4], \text{ if } \frac{1}{5}T < t_i \leq \frac{2}{5}T; \quad (2\text{-}1)$$

$$BP_2 = [6, 10], \text{ if } \frac{2}{5}T < t_i \leq \frac{3}{5}T; \quad (2\text{-}2)$$

$$BP_3 = [12, 22], \text{ if } \frac{3}{5}T < t_i \leq \frac{4}{5}T; \quad (2\text{-}3)$$

$$BP_4 = [24, 36], \text{ if } \frac{4}{5}T < t_i \leq T; \text{ and} \quad (2\text{-}4)$$

$$BP_5 = [48, 94], \text{ if } \frac{4}{5}T < t_i \leq \infty. \quad (2\text{-}5)$$

The time span of the time frame increases exponentially with an increment on a time value kept in Tc. The time frame $BF_5$ may be allocated in block S15.

Figure 7:
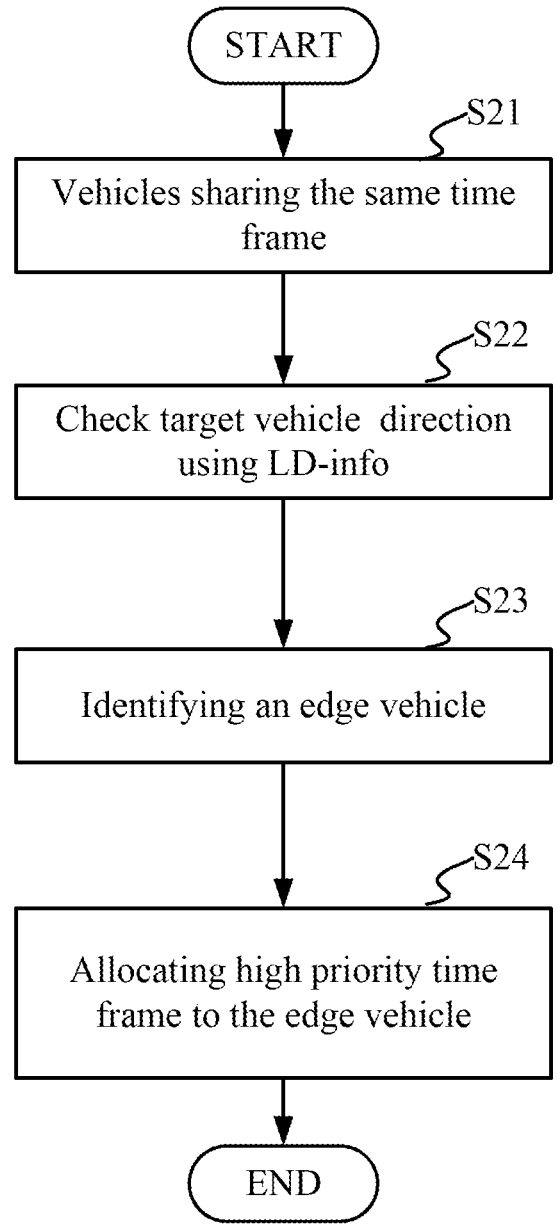
FIG. 7 is a flowchart showing a process of identifying an edge vehicle.

As vehicles are allocated with time frames using the backoff algorithm in block S13, some vehicles may be allocated with the same time frame. A time frame may be divided into a plurality of sub time frames arranged from higher priority sub time frames to lower priority sub time frames. With reference to FIG. 7, in block S13, if a plurality of vehicles sharing the same time frame (block S21), the search and report modules 112 in the plurality of vehicles may check LD-info (block S22) to identify an edge vehicle (block S23), and allocate highest priority sub time frame to the edge vehicle (block S24). The search and report modules 112 may identify a vehicle closest to the target vehicle as an edge vehicle. For example, when the vehicle 12 has LD-info of the vehicle 10, the search and report module 112 in the vehicle 12 identifies the vehicle 12 as an edge vehicle among the vehicles 12 and 15, and allocates highest priority sub time frame to the edge vehicle.

Figure 8:
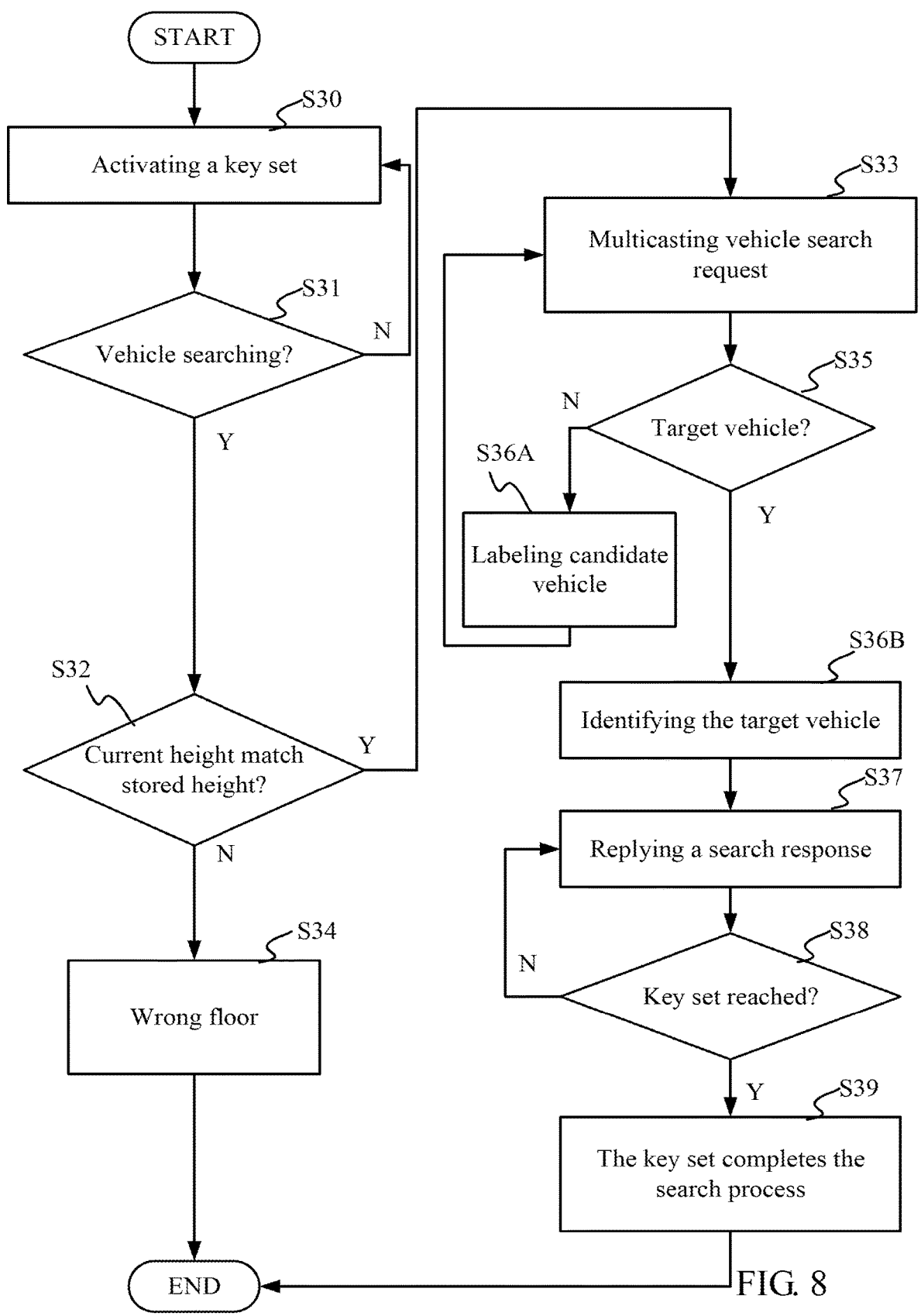
FIG. 8 is a flowchart showing a search and response process of the search and report module.

With reference to FIGS. 5 and 8, a driver of the vehicle 10 revisits the parking lot and activates the key set 19 in FIG. 5 to generate a triggering signal (block S30). The key set 19 determines whether the trigger signal is to trigger a vehicle searching function or not (block S31). If the key set 19 is activated to trigger a vehicle searching function, the key set 19 obtains a current height parameter as a second height parameter in response to the triggering signal, and determines whether the second height parameter matches a height position represented by the first height parameter (block S32). The height position is a number representing the level where the target vehicle is parked.

The key set 19 multicasts a search request for the target vehicle 10 to multiple vehicles that are in a condition where the second height parameter matches the height position (block S33). The search request includes the LPCID of the target vehicle Vt, such as the vehicle 10. The height position may be a number of a floor where the target vehicle 10 is parked. When the second height parameter does not match the height position, the key set 19 determines that the second height parameter represents a wrong level (block S34).

Each of the search and report modules 112 in the vehicles determines whether the search request reaches the target vehicle Vt (block S35), labels a vehicle receiving the search request as a candidate vehicle Vc when the receiving vehicle is not the target vehicle (block S36A), and relays the multicasting vehicle search requests (block S33). With reference to FIG. 5, for example, the key set 19 sends a search request through vehicles 13, 12, and 11 to vehicle 10. The search and report module 112 in the vehicle 13 determines whether the search request reaches the target vehicle Vt (block S35), labels the vehicle 13 receiving the search request as a candidate vehicle Vc when the receiving vehicle 13 is not the target vehicle (block S36A), and relays the multicasting search requests to vehicle 12 (block S33). Similarly, the search and report module 112 in the vehicle 12 determines whether the search request reaches the target vehicle Vt (block S35), labels the vehicle 12 receiving the search request as a candidate vehicle Vc when the receiving vehicle 12 is not the target vehicle (block S36A), and relays the search requests to vehicle 11 (block S33). The blocks S35, S36A, and S33 also applies to the vehicle 11, where the vehicle 11 relays the search request to the vehicle 10. When identifying the target vehicle Vt and the search request reaches the target vehicle Vt (block S36B), the search and report module 112 in the target vehicle Vt replies the search request with a search response along the candidate vehicles Vc to the key set 19 (block S37).

With reference to FIG. 5, for example, when the search request receiving vehicle 10 is identified as the target vehicle Vt (block S36B), the search and report module 112 in the target vehicle 10 replies the search request with a search response along the candidate vehicles 11, 12, and 13 to trace back to the key set 19 (block S37). In the block S37, upon receiving the search response, the search and report module 112 in the search response receiving vehicle labels the search response receiving vehicle as a vehicle in path Vp. In the example, the candidate vehicles 11, 12, and 13 are labeled as Vp.

Each of instances of the search and report module 112 in the vehicles determines whether the search response reaches the key set 19 (block S38), and relays the search response to other vehicles when the search response does not reach the key set 19 (block S37). When the search response reaches the key set 19, the search process is complete (block S39). The search request and the search response may be transmitted through vehicle to vehicle (V2V) wireless communication channels. Examples of the vehicle to vehicle wireless communication includes dedicated short range communications (DSRC), 3rd Generation Partnership Project (3GPP) V2V, long term evolution (LTE), new radio (NR), BLUETOOTH, and Institute of Electrical and Electronics Engineers (IEEE) 802.11p/1609.

Figure 9:
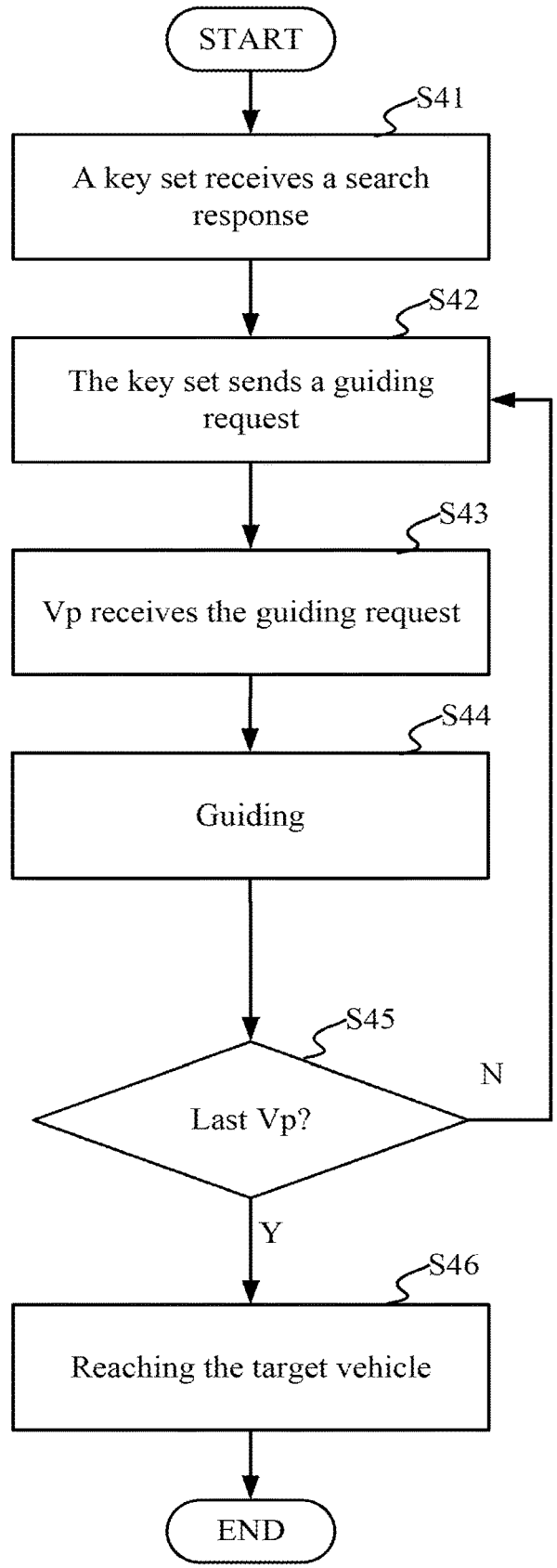
FIG. 9 is a flowchart showing a guiding process of a guiding module.

With reference to FIG. 9, upon receiving the search response (block S41), the key set 19 sends a guiding request to the vehicles labeled as Vp, such as the vehicles 11, 12, and 13 (block S42). Upon receiving the guiding request (block S43), the guiding module 113 in a vehicle labeled as Vp provides guiding services, such as sending a message to the key set 19 or flashing lights on the vehicle Vp (block S44), and determines whether the vehicle Vp is the last vehicle Vp in a path to the target vehicle Vt (block S45). If the vehicle Vp is not the last Vp, the block S42 is repeated where the guiding module 113 in the vehicle Vp relays the guiding request to another vehicle labeled as Vp. If the guiding request receiving vehicle Vp is the last Vp, the guiding module 113 in the vehicle Vp signifies that the target vehicle is reached, such as sending a message to the key set 19 or flashing lights on the vehicle Vp (block S46).

Figure 10:
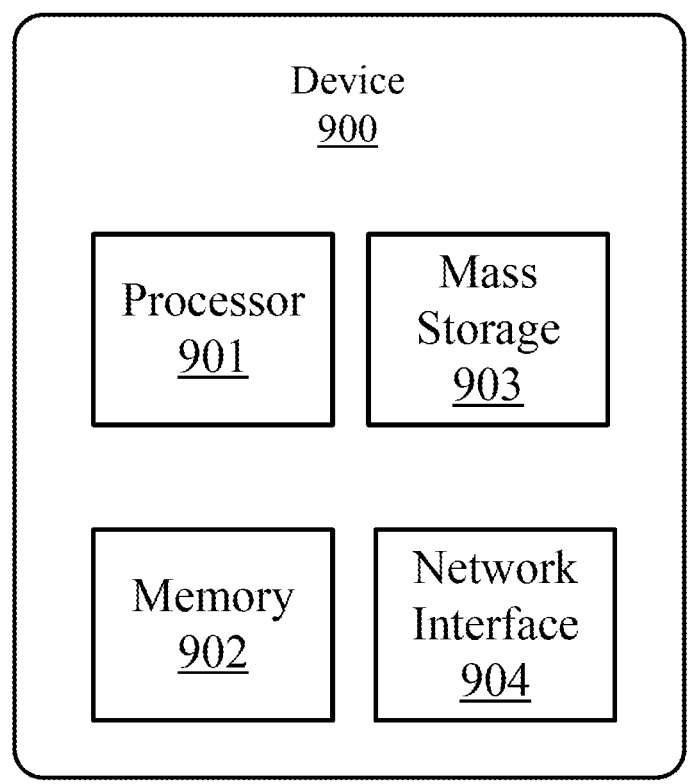
FIG. 10 is a block diagram showing an embodiment of an electronic device executing the method of the present disclosure.

With reference to FIG. 10, the method of the disclosure may be implemented by computer program stored in storage media, such mass storage 903 in a device 900. When the computer program implementing the method is loaded to a memory 902 by a processor 901, the processor 901 in the device 900 executes the disclosed method. The processor 901 communicates with other entities, such as vehicles, through a networking interface 904.

The disclosed method may lead a driver to his car in a parking lot without requiring global positioning system (GPS) signals, and reduce packet flooding through the back off algorithm and the LD-info. The key set records a height parameter representing a level of the parking lot where the target vehicle is parked.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method for finding a parked vehicle and executable by an electronic device, and installable in a vehicle, the method comprising:
   broadcasting a vehicle to vehicle communication packet from a target vehicle, wherein the vehicle to vehicle communication packet includes a time stamp, an identifier and light direction information of the target vehicle;
   obtaining sensor parameters from the target vehicle in response to an ignition key removing event associated with an ignition key, wherein the sensor parameters includes a first height parameter indicating a level on which the vehicle is parked;
   storing the obtained sensor parameters in a key set associated with the ignition key of the target vehicle;
   upon revisiting the vehicle, receiving a triggering signal, generated by the key set, to activate delivery of a search request for the target vehicle;
   obtaining a second height parameter by the key set in response to the triggering signal;
   determining whether the second height parameter matches a height position represented by the first height parameter among the sensor parameters; and
   multicasting, by the key set, a search request for the target vehicle from the key set when the second height parameter matches the height position.

2. The method of claim 1, wherein the height position is a number of a level where the target vehicle is parked.

3. The method of claim 1, the method further comprising: receiving by the key set a search response.

4. The method of claim 1, wherein the light direction information comprises component specific identifiers of a right head light, a left head light, a right tail light, and a left tail light of the target vehicle, the method further comprises:

transmitting the component specific identifiers through visible light communication from the right head light, the left head light, the right tail light, and the left tail light.

5. A method for finding a parked vehicle and executable by an electronic device, and installable in a vehicle, the method comprising:
receiving, by a neighboring vehicle, a vehicle to vehicle communication packet from a target vehicle, wherein the vehicle to vehicle communication packet includes a time stamp, an identifier and light direction information of the target vehicle;
storing, by the neighboring vehicle, the time stamp, the identifier, and the light direction information of the target vehicle; and
receiving, by the neighboring vehicle, a search request for the target vehicle from a source of the search request;
relaying, by the neighboring vehicle, the search request based on the time stamp and the light direction information of the target vehicle;
receiving a search response responding to the search request;
labeling a guiding vehicle receiving the search response in response to the search response; and
relaying the search response to the source of the search request.

6. The method of claim 5, the method further comprising:
determining a time frame based on a length of time counted up from reception of the vehicle to vehicle communication packet, wherein the relaying of the search request is executed in the time frame.

7. The method of claim 6, wherein a time span of the time frame increases exponentially as the length of time counted up from reception of the vehicle to vehicle communication packet increases.

8. The method of claim 6, wherein the length of time counted up from a time value is represented by the time stamp.

9. The method of claim 6, wherein the time frame is divided into a plurality of sub time frames arranged from a highest priority sub time frame to a lowest priority sub time frame, the method further comprising:
identifying a vehicle closest to the target vehicle as an edge vehicle based on the light direction information of the target vehicle;
allocating the highest priority sub time frame to the edge vehicle, wherein the relaying of the search request is executed by the edge vehicle in the highest priority sub time frame.

10. The method of claim 5, the light direction information comprises component specific identifiers of a right head light, a left head light, a right tail light, and a left tail light of the target vehicle.

11. The method of claim 10, wherein the component specific identifiers are transmitted through visible light communication.

12. A system for finding a parked vehicle and executable by an electronic device, and installable in a vehicle, the system comprising:
a search and report module executing instructions for:
receiving, by a neighboring vehicle, a vehicle to vehicle communication packet from a target vehicle, wherein the vehicle to vehicle communication packet includes a time stamp, an identifier and light direction information of the target vehicle;
storing, by the neighboring vehicle, the time stamp, the identifier and the light direction information of the target vehicle; and
receiving, by the neighboring vehicle, a search request for the target vehicle from a source of the search request;
relaying, by the neighboring vehicle, the search request based on the time stamp and the light direction information of the target vehicle;
receiving a search response responding to the search request;
labeling a guiding vehicle receiving the search response in response to the search response; and
relaying the search response to the source of the search request.

13. The system of claim 12, wherein the search and report module further executes instructions for:
determining a time frame based on a length of time counted up from reception of the vehicle to vehicle communication packet, wherein the relaying of the search request is executed in the time frame.

14. The system of claim 13, wherein the time span of the time frame increases exponentially as a length of time counted up from reception of the vehicle to vehicle communication packet increases.

15. The system of claim 13, wherein the length of time counted up from a time value is represented by the time stamp.

16. The system of claim 13, wherein the time frame is divided into a plurality of sub time frames arranged from a highest priority sub time frame to a lowest priority sub time frame, the search and report module further executes instructions for:
identifying a vehicle most close to the target vehicle as an edge vehicle based on the light direction information of the target vehicle;
allocating the highest priority sub time frame to the edge vehicle, wherein the relaying of the search request is executed by the edge vehicle in the highest priority sub time frame.

17. The system of claim 12, the light direction information comprises component specific identifiers of a right head light, a left head light, a right tail light, and a left tail light of the target vehicle.

18. The system of claim 17, wherein the component specific identifiers are transmitted through visible light communication.

* * * * *